INVENTORS J. H. MAYER
D. MITCHELL
BY Roy M. Porter Jr.
ATTORNEY

March 14, 1967 J. H. MAYER ETAL 3,309,470

APPARATUS FOR INDICATING DISTURBANCES ON A COMMUNICATION LINE

Filed Nov. 14, 1963 4 Sheets-Sheet 3

3,309,470
Patented Mar. 14, 1967

3,309,470

APPARATUS FOR INDICATING DISTURBANCES ON A COMMUNICATION LINE

James H. Mayer, Middletown Township, Monmouth County, and Doren Mitchell, Martinsville, N.J., assignors to Bell Telephone Laboratories, Incorporated, New York, N.Y., a corporation of New York Filed Nov. 14, 1963, Ser. No. 323,707
5 Claims. (Cl. 179—175.3)

This invention relates to the detection of transmission disturbances on communication lines, especially when the same lines are used both for supervisory signaling and for the transmission of voice or data messages. Supervisory signaling is the signaling process which directs interconnection of communication lines to provide a complete path for the transmission of messages. Transmission disturbances include message path interruptions, known as hits, and spurious noise voltages.

A measure of the probability of occurrence transmission disturbances has a variety of uses. The source of the disturbance may be located and eliminated; or, especially when machines talk to machines, error correcting equipment may be provided with a level of complexity directly related to the measured probability.

One type of prior art technique for indicating hits and noises removes the communication line from service and tests it. Another type leaves the line in service and distinguishes disturbances from messages by reliance on some predictable pattern of the received message. The former technique has become prohibitevely expensive, while the latter fails entirely with modern data communication systems because the transmission of the maximum possible useful data in the shortest possible time prevents the formation of a predictable pattern of the received message. It is axiomatic that a received message is useful only if it tells something which was not predictable without it. Nevertheless, even in a data communication system, the supervisory signal still retains sufficient predictability to allow it to be distinguished from many transmission disturbances.

Therefore, it is an object of the invention to obtain indications of transmission disturbances on a communication line with improved reliability while leaving it available for service.

It is a further object of the invention to obtain reliable indications of transmission disturbances on a communication line that is available for communication between data machines.

A still further object of the invention is to obtain reliable indications of transmission disturbances on an available communication line having a common transmission path for supervisory signaling and messages.

According to the invention, transmission disturbances on a communication line available for service are detected and recorded during the idle periods of the line. Ambiguous indications that might be caused by transmission disturbances, supervisory signaling or message transmission are temporarily stored while a sequence of logic operations is performed. The logic depends on the fact that supervisory signaling and the usual subsequent message require a longer time than the duration of most disturbances, even those which may fluctuate with a rate and amplitude resembling supervisory signaling. When the logic sequence shows that the indications remain ambiguous at least as long as the expected minimum duration of a call, the ambiguous indications are erased; and no further disturbances are recorded until a normal idle condition of the line is clearly restored. If the logic sequence is able to resolve the ambiguity in less than the expected minimum duration of a call, thus indicating that the line is still idle, the ambiguous indications are recorded as transmission disturbances.

It should be noted that it is not necessary for repetitions of transmission disturbances to cease entirely before the ambiguity may be resolved. For instance, in one embodiment of the invention, it is sufficient that an otherwise ambiguous disturbance fluctuates at a substantially lower rate than supervisory signaling at any time during the minimum expected duration of a telephone conversation.

A specific embodiment of the invention, as disclosed in detail herein, indicates transmission disturbances in a communication system of the voice frequency supervisory signaling type. Tones are transmitted through the same paths as messages. The received tone is usually constant during idle periods of the line and thus may be called and idle channel marking signal. The marking signal is characteristically absent during message transmission. Supervisory signaling is accomplished by substantial changes in the magnitudes of the received tone. These changes are converted to direct-current signals for controlling a local trunk relay circuit, which is a circuit that effects interconnection of communication lines by means of relays. The aforementioned substantial changes in the magnitude of the received tone are usually alternating presence and absence of the tone for characteristic intervals. Applicants have recognized that transmission disturbances, especially hits, can produce such substantial reduction in the magnitude of the received tone that false direct-current signals are produced. These disturbances are particularly indicative of poor line quality and should be recorded, yet their observable effects are ambiguous since the observable reduction in received tone may be confused with supervisory signaling, which should not be recorded as a disturbance.

To resolve the ambiguity so that such large disturbances may be recorded, applicants provide that all changes in the magnitude of the received supervisory tone will be detected. Those changes which do not produce direct-current signals are immediately recorded as hits or noise. Those changes which do produce direct-current signals are temporarily blocked from the recorder and temporarily stored. If the logic circuit shows that the expected minimum duration of a telephone call, for example three seconds, passes without a recommencement of the normal idle tone for a longer time than the characteristic intervals of supervisory signaling, the stored changes are erased because a distant trunk relay circuit is presumptively seeking to connect the line to complete a message circuit. In the case that the logic circuit shows that the normal idle tone is again received for a longer time than the characteristic intervals of supervisory signaling before the passage of three seconds after the sudden change, the stored change is permanently recorded as a transmission disturbance.

Also, if a logic circuit shows that the local trunk relay circuit is seeking to connect the line to complete a message circuit, the stored changes are erased. Immediate erasure in response to local seizure is preferred over the use of the timing logic because the stored changes may be caused by signaling responses from the distant end of the line and thus may be eliminated without further delay.

According to a feature of the invention, whenever requests for the line are made by the distant trunk relay circuit but prematurely abandoned so that normal idle tone is again received at the local end of the line before the passage of three seconds after the initial change in the received tone, these short abandoned calls are recorded at the distant end. These short abandoned calls at the distant end are not properly labeled as transmission disturbances, yet they will be recorded as such at the local end of the line. Therefore, the locally recorded disturbances are reduced by the probable number of them which are caused by the distantly recorded short abandoned calls in order to get an accurate count of transmission disturbances.

If separate records of different types of disturbances are required, such as separate records of noise and hits, separate detectors and records may be controlled by the same logic circuitry, especially, if it is found that both of these types of disturbances may in some circumstances ambiguously resemble supervisory signaling on the line.

If it is desired to make a common master record of the disturbances on a plurality of lines or toll trunks terminating in the same vicinity, a disturbance indicator apparatus according to the invention is provided for each of the trunks. Detected changes that are otherwise ready for permanent recording as disturbances are again temporarily stored, preferably in memories separate from the storage sites used while ambiguities are being resolved. Common control equipment then scans these second temporary memories periodically in a fixed sequence and transfers their contents to a recorder.

Further understanding of the invention may be obtained from the following detailed description and the drawing, in which.

Figure 1:
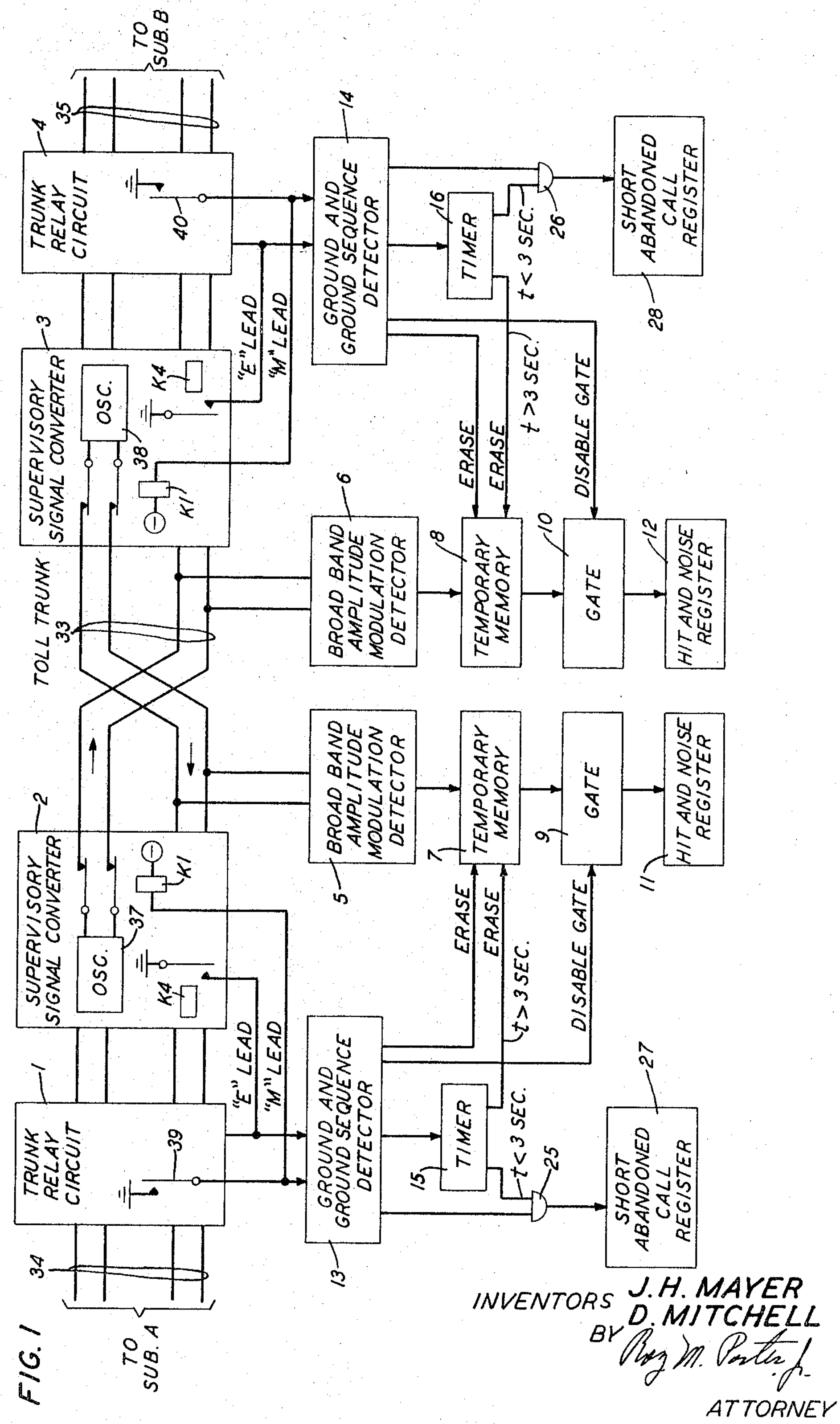
FIG. 1 is a schematic and block diagrammatic showing of a preferred embodiment of the invention as applied to a communication line on which voice frequency supervisory signaling is used.

In FIG. 1 the communication line or toll trunk 33, the supervisory signal converters 2 and 3 and the trunk relay circuits 1 and 4 are arranged according to the teaching of United States Patent No. 2,765,371 of W. W. Fritschi and A. Weaver, issued Oct. 2, 1956, which is incorporated by reference herein. For example, supervisory signal converter 3 and trunk relay circuit 4 of the present disclosure are arranged in the same relative positions as the like components of FIG. 1 of the above-cited patent. Converter 2 and relay circuit 1 are, of course, identical circuits at the opposite end of trunk 33.

For the sake of completeness and clarity, the characteristics of supervisory signal converters 2 and 3 and trunk relay circuits 1 and 4 that are relevant to the present invention will be described in detail hereinafter.

In general, E leads provide direct-current signaling from a supervisory signal converter to a trunk relay circuit, while M leads provide direct-current signaling from a trunk relay circuit to a supervisory signal converter, as is more fully explained in the above-cited patent of Fritschi and Weaver.

The voice frequency supervisory signaling, of the type to which the embodiment of FIG. 1 is adapted, uses three levels of tones, which may be designated high, low, and none. These levels may be seen in curves 51, 52, 54 and 57 of FIG. 2. It happens that some transmission disturbances on toll trunk 33 can momentarily cause similar variations in the level of the tone. For instance, a hit can interrupt or sufficiently reduce the level of the received tone to ground the E lead. Both the tone level change and the grounding of the E lead are therefore ambiguous because both can accompany either supervisory signaling or a hit. Thus, if a transmission disturbance indicator is to obtain reliable data from toll trunk 33 while trunk 33 is available for service, that indicator must resolve this ambiguity.

In FIG. 1, broad band amplitude modulation detectors 5 and 6 detect all changes in the tone received at their respective ends of trunk 33. The A.M. detectors 5 and 6 may be similar to the modulation detecting circuitry of H. I. Romnes Patent 2,169,851, issued Aug. 15, 1939.

That is, applicants' broad band amplitude modulation detectors 5 and 6 could use the circuitry of Romnes' FIG. 1, beginning with transformer 1 and ending with transformer 5, with the modifications that capacitors 20, 21, 23 and 24 would be replaced with short circuit connections. Capacitor 26 and the succeeding circuitry would be replaced with a 1500 cycle per second low pass filter connected on the output of transformer 5 and an isolation amplifier connected on the output of the low pass filter. The output of the isolation amplifier would be connected across input 31 of temporary memory 7, as shown in applicants' FIG. 4. Applicants' A.M. detectors 5 and 6 might alternatively use the circuitry of Romnes' FIG. 3, with the addition of a bridging transformer connected across the line and an isolation amplifier connected between the output of the bridging transformer and the input of transformer 300 in order to increase the input impedance of the detector. As a further modification, gas tubes 304 and 305 and relays 306 and 307 of Romnes' FIG. 3 would be replaced with hard vacuum tube amplifiers or transistor amplifiers, with the fixed bias level provided by resistors 309 and 311 set to determine the minimum magnitude of disturbance that will produce a detector output. Here again, a 1500 cycle low pass filter would be connected across the load circuit of these last-mentioned amplifiers, and an isolation amplifier would be connected across the output of the low pass filter. The output of the latter isolation amplifier would be connected across input 31 of temporary memory 7, as shown in FIG. 4.

Although all substantial changes in tone level are detected, only those changes which successfully pass through temporatry memories 7 and 8 and gates 9 and 10 are registered on hit and noise registers 11 and 12, respectively. Hit and noise registers 11 and 12 may be standard message registers that include at least one auxiliary make or break contact. A preferred type of message register, well known in the art, is described by W. G. Laskey in "The New Message Register," Bell Laboratories Record, 1953, pages 386–391.

It is, of course, clear that transmission disturbances which amplitude modulate the received tone and yet do not ground the E lead may be promptly recorded. Such a disturbance detected by amplitude modulation detector 5 is passed through temporary memory 7 and gate 9 into the permanent register 11. Gate 9 is open or not disabled so long as the E lead of converter 2 is open. When, however, the E lead is grounded, ground and ground sequence detector 13 disables gate 9 so that detected amplitude changes entering temporary memory 7 are not passed to register 11. Ground detector 13 is arranged, as explained in more detail hereinafter in reference to FIG. 3, to continue disabling gate 9 during opens of the E lead lasting less than 100 milliseconds, a brevity of open condition which may indicate E lead response to dial pulsing from the distant end of the line 33.

After the E lead has remained thus grounded for three seconds or more, timer 15 generates an output which erases the contents of temporary memory 7. This operation is based on the premise that such a sustained grounded condition of the E lead indicates that trunk relay circuit 4 is requesting the use of toll trunk 33.

When the E lead of converter 2 is opened for 100 milliseconds or more, gate 9 is opened. If less than three seconds have then elapsed since the initial grounding of the E lead of converter 2 before its M lead, temporary memory 7 will still have unerased contents, which are then transferred to premanent noise and hit register 11.

No delay before erasing is necessary when the local trunk relay circuit 1 request the use of trunk 33, because the M lead of converter 2 is originally grounded before its E lead. In response to this sequence, the ground sequence detector 13 immediately erases the contents of temporary memory 7, and the erasing continues until both the M lead and the E lead are again opened.

This supervisory signaling information is unambiguous at the calling end of the line, but it is only an ambiguous loss of received tone at the called end of the line. In the case in which the M lead at the calling end of trunk 33 was grounded before the E lead, and the M lead is again opened for more than 100 milliseconds within three seconds after its grounding, a hit is erroneously recorded by register 12 at the called end of trunk 33. To permit compensation for this error, a feature of the invention provides that a count is registered on short abandoned call register 27 at the calling end of trunk 33. Short abandoned call register 27 is also a message register of the type described in the above-cited article of Laskey.

Figure 2:
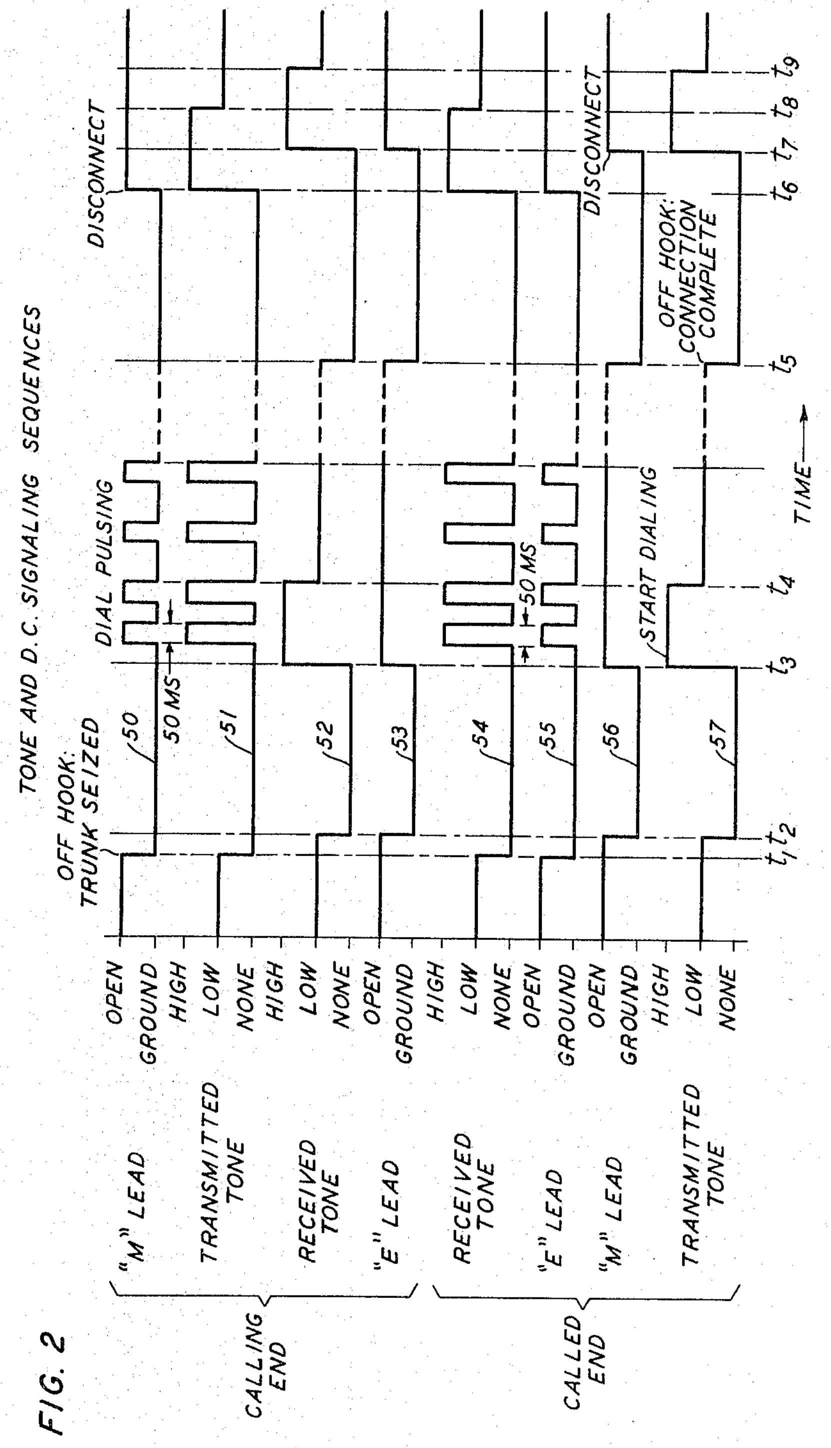
FIG. 2 shows curves depicting the voice frequency supervisory signal sequences with relation to the direct-current signals involved in controlling a typical trunk relay circuit of the type shown in FIG. 1.

The erroneous hit indication at the called end of the trunk 33 occurs because ground detector 14 and timer 16 interpret the disconnect in less than three seconds as signifying that only transmission disturbances have occurred. Ground detector 14 opens gate 10, which passes the still unerased contents of temporary memory 8 to noise-and-hit register 12. Thus, two counts, corresponding to the sudden changes in the received tone at times $t_1$ and $t_8$, as shown in curve 54 of FIG. 2, are erroneously recorded on hit-and-noise register 12. Any further disconnect transients will cause additional erroneous counts to be recorded on register 12. This number of erroneous counts, for example X, will always be fixed for a short abandoned call in a given system. Thus, X times the number of counts on short abandoned call register 27 are subtracted from the counts on permanent hit-and-noise register 12 to determine the true number of transmission disturbances detected by detector 6, and X times the number of counts on short abandoned call register 28 are subtracted from the counts on permanent hit-and-noise register 11 to determine the true number of transmission disturbances detected by detector 5. The subtraction may be performed manually or by logic equipment after the data from both ends of trunk 33 have been collected in one place.

It is noted that the hit-and-noise indicating circuitry at the right-hand end of toll trunk 33 in FIG. 1 operates in the same way as the hit-and-noise indicating circuitry at the left-hand end.

Attention is now directed to the preferred specific implementation of the left-hand half of the embodiment of FIG. 1 and to the relationship of that implementation to the nature of the signals used in the supervisory signaling system of the above-cited patent of Fritschi and Weaver. The supervisory signals behave as follows.

During the idle condition of toll trunk 33 low level tones are transmitted in both directions. This tone is represented by the initial portions of curves 51, 52, 54 and 57 of FIG. 2, wherein it is understood that the transmitted tone of one end of the trunk is the received tone of the other end. If subscriber A requests a connection to subscriber B, trunk relay circuit 1 cuts off the transmitted tone of supervisory signal converter 2 by closing contacts 39, thereby grounding the M lead through contacts 39, as shown at time $t_1$ of curve 51 of FIG. 2, and actuating relay $K_1$ to disconnect oscillator 37. At the called end of the line, supervisory signal converter 3 responds to its loss of received signal as shown by curve 54 of FIG. 2, by actuating relay $K_4$ and grounding the E lead between converter 3 and relay circuit 4, as shown by curve 55.

A short time after the grounding of the E lead in signal converter 3, that is, at time $t_2$ in FIG. 2, trunk relay circuit 4 acknowledges the same by grounding its M lead, as shown in curve 56, and cutting off the transmitted tone from converter 3, as shown in curve 57. At the calling end of line 33, converter 2 responds to the loss of its received tone, as shown in curve 52, by grounding its E lead, as shown in curve 53.

At time $t_3$ trunk relay circuit 4 at the called end orders trunk relay circuit 1 at the calling end to start dialing. Specifically, relay circuit 4 opens contacts 40 to unground the M lead of relay circuit 4, thereby causing signal converter 3 to transmit a high level tone, as shown in curve 57 of FIG. 2. In response to the high level tone received at the calling end, as shown in curve 52, relay $K_4$ in converter 2 opens its E lead, as shown in curve 53. In response, trunk relay circuit 1 begins dial pulsing by periodically opening and grounding its M lead according to the request from subscriber A, as shown in curve 50; and converter 2 transmits corresponding intermittent pulses of high level tones, each pulse lasting about 50 milliseconds, as shown in curve 51. The E lead of converter 3 repeats this information to trunk relay circuit 4 by corresponding opens and grounds, as shown in curve 55. The connection is completed at time $t_5$ when subscriber B answers.

Disconnect at either end opens the corresponding M lead and produces, as shown at times $t_6$ and $t_7$ in FIG. 2, precisely the high level transmitted tone which would be expected from the preceding description of a start dialing order, but no dial pulses occur because no further dialing instructions have been received by the trunk relay circuit at the other end of the line.

Figure 3:
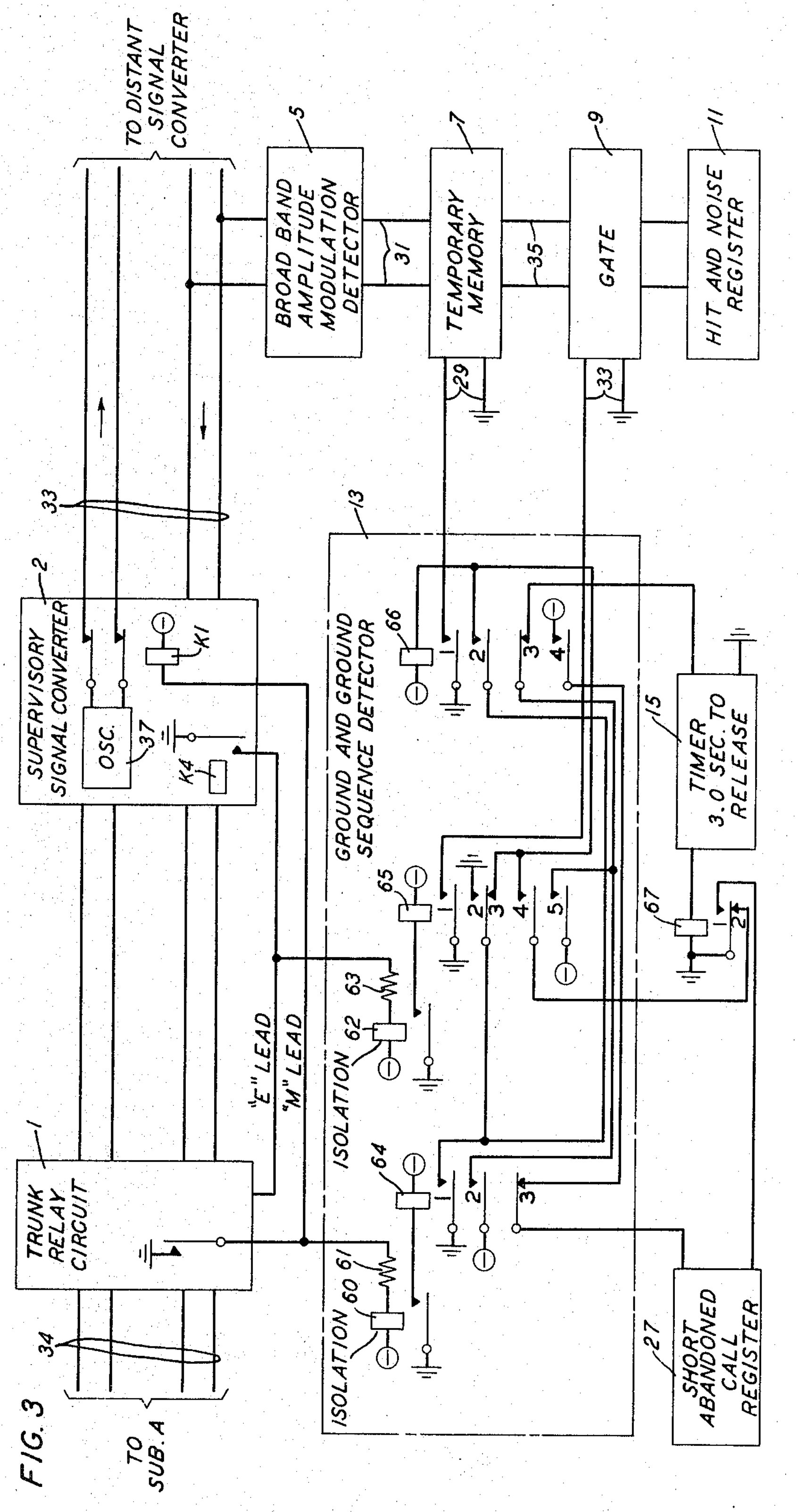
FIG. 3 is a schematic and block diagrammatic showing of the embodiment of FIG. 1 particularly detailing an illustrative arrangement of the ground and ground sequence detector.
Figure 4:
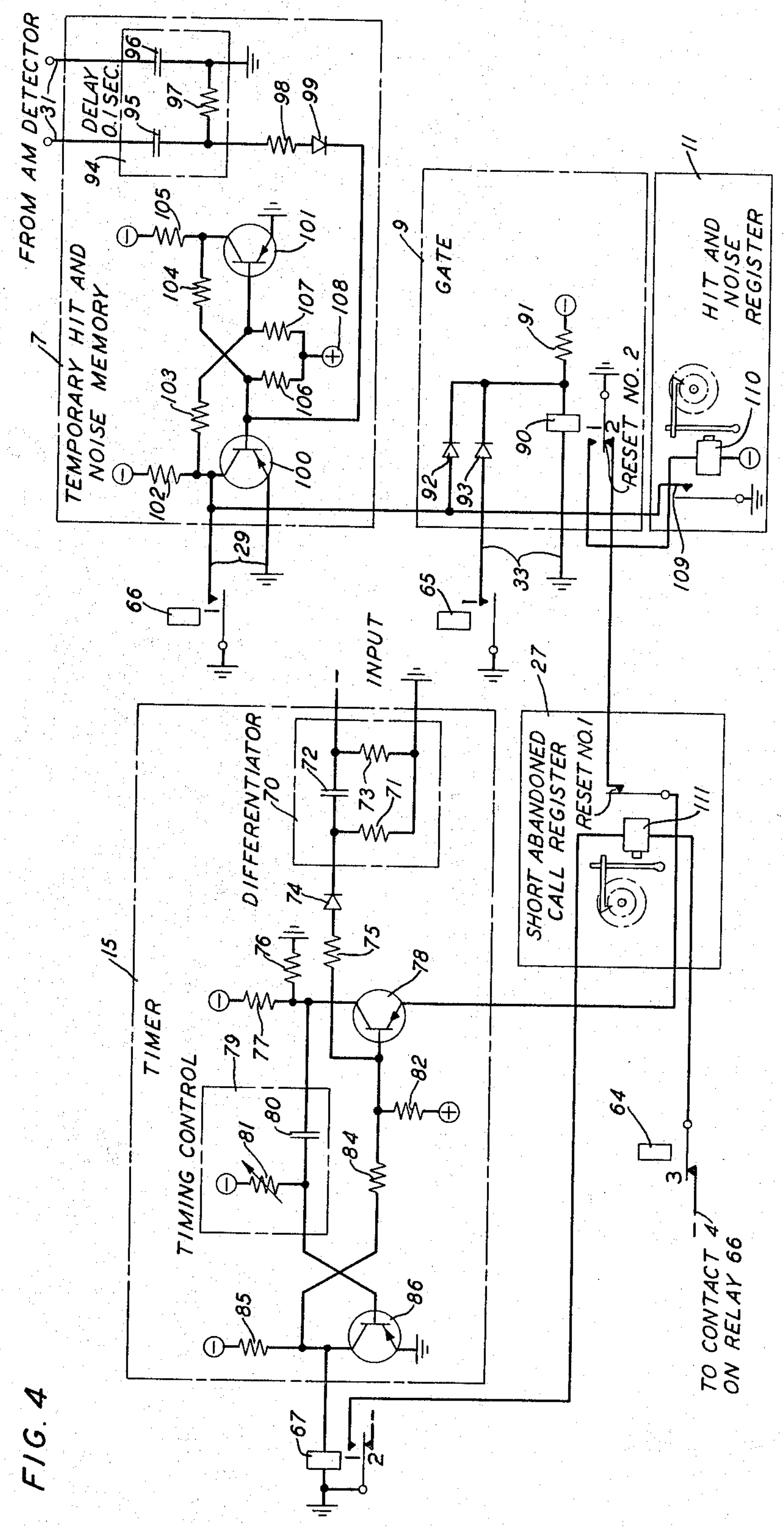
FIG. 4 is a schematic and block diagrammatic showing of an illustrative arrangement of a timer, temporary memory and gate for the embodiment of FIG. 1.

The detailed structure and interconnection of ground and ground sequence detector 13 for discriminating the essential character of these signals is shown in FIG. 3. When the E lead is grounded, isolation relay 62 actuates relay 65; and when the M lead is grounded, isolation relay 60 actuates relay 64. Resistors 63 and 61 prevent excessive power drain from relay circuit 1 and supervisory signal converter 2. It is clear that electronic isolation amplifiers could be used instead of isolation relays.

Both relay 64 and relay 65 are 100 millisecond slow release relays. Their slow release characteristics allow them to maintain their actuated states in spite of dial pulsing by the M lead and momentary opening of the E lead in response to intermittent dialing tones received by converter 2 from converter 3.

Let it be assumed that the E lead is grounded before the M lead because of a change in the tone received by converter 2.

When relay 65 is actuated, its contact 1 shorts out the input 33 of gate 9. As shown in FIG. 4, current then flows through clamping diode 93 and resistor 91 to negative battery. The voltage across relay 90 is clamped to the voltage drop across diode 93, and relay 90 is held released so that it back contact 2 remains closed and front contact 1 open. No signal can pass to noise-and-hit register 11. A delay of 0.1 second at the input of memory 7, as shown in FIG. 4, permits relays 62 and 65 time to operate before signals arrive at gate 9.

The closure of contact 4 on relay 65 does not operate relay 66 because contact 2 of relay 67 is opened before relay 66 can operate. In fact, applicants prefer that relay 66 require about 15 milliseconds longer for operation than relays 64, 65 and 67.

As shown in FIG. 3, closure of contact 5 on relay 65 starts a timing cycle of time 15. As may be seen in FIG. 4, the negative input voltage to timer 15 turns on transistor 78. The collector potential of transistor 78 becomes more positive as the collector current flows through resistor 77; and the potential of the base electrode of transistor 86 rises correspondingly. Transistor 86 turns off, and relay 67 is actuated to close its contact 1. The collector potential of transistor 86 becomes more negative in response to the decreased current in resistor 85, and the increased current in resistors 82 and 84 clamps the base electrode potential of transistor 78 at a conduction level. Capacitor 80 starts to discharge through resistor 81 so that the base potential of transistor 86 will fall to conduction potential upon the passage of three seconds.

If three seconds now pass with relay 65 operated, transistor 86 conducts again; and relay 67 releases, closing the contact 2 of relay 67 and actuating relay 66 through contact 4 of relay 65. Closure of contact 1 of relay 66 erases temporary memory 7 by restoring transistor 100 to its normally conducting state and transistor 101 to its normally nonconducting state, as shown in FIG. 4. As shown in FIG. 3, closure of contact 2 of relay 66 completes a holding circuit for relay 66; and relay 66 will not release until contact 1 of relay 64 and contact 2 of relay 65 are both opened. Relay 66 has a 500 millisecond slow release characteristic, so that erasing continues until both E and M leads are open about 600 milliseconds. In this time, all transients in the received tone that normally follow a terminated call should subside.

Opening of normally closed contact 3 of relay 66 disconnects negative battery from the input of timer 15. The differentiator 70 at the input of timer 15 returns to normal so that timer 15 is ready for the next timing cycle. The positive pulse generated by the discharge of capacitor 72 is blocked from transistor 78 by diode 74.

In the preceding description of ground and ground sequence detector 13, grounding of the E lead prevents actuation of relay 66 by subsequent grounding of the M lead because contact 3 of relay 65 is broken before contact 1 of relay 64 is closed. Therefore, whenever the E lead is grounded before the M lead, the memory-erasing relay 66 can be actuated only through back contact 2 of relay 67 in response to a lapse of a timing cycle in timer 15. This arrangement is an essential part of the ground sequence detector 13. However, whenever the M lead is initially grounded before the E lead, the closing of the contact 1 of relay 64 before the opening of the contact 3 of relay 65 actuates relay 66 through said contacts to erase temporary memory 7 without waiting for the completion of a timing cycle by timer 15. The latter sequence of closing of relays 64 and 65 corresponds to a certain seizure of trunk 33 by trunk relay circuit 1. This fact may be verified by an inspection of the E and M lead sequences shown in FIG. 2.

Whenever the M lead is grounded before the E lead, the closing of contact 2 of relay 64 occurs faster than the opening of contact 3 of relay 66, as described hereinbefore. The consequent starting of timer 15 actuates relay 67 to close its contact 1.

The actuation of relay 66 also closes its contact 4. If the M lead opens and relay 64 releases less than three seconds after the operation of relay 64, then contact 3 of relay 64 closes, and a short abandoned call is recorded on abandoned call register 27 through contact 3 of relay 64, contact 4 of relay 66 and contact 1 of relay 67. If relay 67 releases before relay 64, then no abandoned call is recorded. It is seen that, while contact 3 of relay 64 and contact 4 of relay 66 are a part of ground sequence detector 13 of FIG. 1 and, while contact 1 of relay 67 is associated with timer 15, the series connection between the first two aforementioned contacts, on the one hand, and the latter contact, on the other hand, comprise AND gate 25 of FIG. 1.

Simultaneously with the recording of a count on short abandoned call register 27, armature 111 of register 27 breaks contacts 87, thereby returning transistor 78 of timer 15 to its normally nonconducting state and resetting timer 15. For cases in which abandoned call register 27 has a make contact but not a break contact, the make contact is connected across relay 67. The closing of such a make contact increases the current through resistor 85, thereby applying a positive pulse to the base electrode of transistor 78 to turn off transistor 78 and reset timer 15.

Referring more specifically to FIG. 4, timer 15 comprises a monostable multivibrator and resistance-capacitance discharge timing of the nonstable state, during which relay 67 is actuated. Such circuits are well known in the art and many modifications might be used.

It may be seen that temporary memory 7 is a bistable multivibrator similar to the monostable multivibrator of timer 15, except that resistive connections through battery 103 are used instead of a timing circuit 79.

A change in the transmitted tone detected by detector 5 is stored in a nonconducting condition of transistor 100. In gate 9, if clamping diode 93 is not conducting through contact 1 of relay 65, clamping diode 92 clamps the voltage across relay 90 to a voltage nearly equal to the voltage from emitter to collector of transistor 100. With transistor 100 and diode 93 nonconducting, this voltage is approximately the battery voltage. Consequently, relay 90 will close its contact 1. Armature 110 of message resistor 11 then operates to record a count on register 11. The operation of relay 90 also opens its contact 2, thereby breaking the emitter lead of transistor 78 in timer 15. Transistor 78 returns to its normally nonconducting state, and timer 15 is reset. Upon the recording of a count on register 11, armature 110 momentarily closes contacts 109 to erase memory 7 by returning transistor 100 to its normally conducting condition. That is, the increased current through resistor 102 applies a positive pulse to the base of transistor 101, turning it off and turning transistor 100 on, according to conventional transistor multivibrator action. Relay 90 in gate 9 releases.

Memory 7 might be adapted to use any of the bistable multivibrator circuits known in the art. It could also use capacitor storage. In such a store, a capacitor would appear across output 29 of memory 7. Because of the 0.1 second delay at the input of memory 7, transmission disturbances which do not cause grounding of the E lead can be recorded at the rate of ten per second. Since there is no ambiguity in such disturbances, gate 9 remains continuously in a transmission condition.

For a common master record of disturbances on a plurality of trunks having, for example, left-hand ends terminating in the same central office, an indicating apparatus according to the invention is provided for each of the trunks, except that noise-and-hit register 11 would be common to all of them. An additional temporary memory, such as a storage capacitor, would be connected on the output of each gate 9. Common control equipment then scans these additional temporary memories periodically in a fixed sequence and transfers their contents to register 11.

It should be clear that for types of supervisory signaling different from that illustrated in FIG. 2, other ways of implementing the logic of the invention may be devised in accordance with the teaching of applicants.

It is to be understood that the above-described arrangements are merely illustrative of applications of the principles of the invention. Numerous other arrangements may be devised by those skilled in the art without departing from the spirit and scope of the invention.

What is claimed is:

1. In a communication system of the type in which an idle channel marking signal has characteristic presence intervals and characteristic absence intervals that alternate for supervisory signaling, said marking signal being continuously absent during subscriber message signaling, an apparatus for indicating channel transmission disturbances, comprising means for detecting changes in said marking signal, means for temporarily storing detected changes that are accompanied by absence of said marking signal, means for erasing said stored changes whenever said accompanying absence together with any alternating presence of said marking signal at least as short as said characteristic presence intervals endures at least as long as an expected minimum duration of said supervisory and said subscriber message signaling, and means for making a permanent record of all of said detected changes that are not erased.

2. In a communication system of the type in which a first marking signal is transmitted from a first end to a second end of an idle toll trunk and a second marking signal is transmitted from said second end to said first end and in which connecting equipment at each one of said ends changes in steps the level of said marking signal transmitted from said one end for supervisory signaling such as a request initiated at said one end for connection of said toll trunk for subscriber message signaling, said marking signal being characteristically absent during said subscriber message signaling, an apparatus for indicating disturbances on said toll trunk, comprising first and second means coupled to said first and second ends respectively for detecting changes in the level of said marking signal transmitted from the other of said ends, first and second storing means coupled to said first and second detecting means respectively for temporarily storing ones of said detected changes that are similar to said steps, first and second erasing means coupled to said connecting equipment at said first and second ends respectively and coupled to said first and second storing means respectively for erasing said stored changes whenever said coupled connecting equipment initiates said connection request and whenever said detected changes resemble said supervisory and subscriber message signaling from the other of said ends for a period at least as long as an expected minimum duration of said supervisory and subscriber message signaling, first and second gating means coupled to said connecting equipment at said first and second ends respectively and coupled to said first and second storing means respectively for blocking said stored changes while said detected changes resemble said supervisory and subscriber message signaling and for gating out said stored changes and other unerased ones of said detected changes whenever said detected changes become dissimilar to said supervisory and subscriber message signaling, first and second recording means coupled to said first and second gating means respectively for recording changes gated out of said gating means, and third and fourth recording means coupled to said connecting equipment at said first and second ends respectively for recording the number of said connection requests that are initiated and subsequently abandoned at said first and second ends respectively within said expected minimum duration, said number being correlatable with the recorded changes at the other of said ends to yield an indication of the quantity of true disturbances detected at said other end.

3. In a telephone communication system of the type in which a supervisory signal converter at each end of a toll trunk converts a direct-current supervisory signal from connecting equipment at said end into an alternating-current supervisory signal outgoing on said trunk and also converts an alternating-current supervisory signal incoming from said trunk into a direct-current supervisory signal to said connecting equipment, apparatus for indicating transmission disturbances on said trunk, comprising an amplitude modulation detector at each end of said trunk for detecting level changes in said incoming signal, a first recorder at each end of said trunk for recording said disturbances, a gate coupled between said detector and said recorder for blocking transmission of one of said changes from said detector to said recorder whenever the direct-current signal to said connecting equipment simulates a request for use made from the other end of said trunk, an erasable memory coupled between said detector and said gate for storing said blocked level change, means coupled to said connecting equipment and to said memory for erasing said memory whenever the direct-current signal from said connecting equipment requests use of said trunk and whenever the direct-current signal to said connecting equipment simulates a use request from the other end of said trunk lasting at least as long as a fixed time, and a second recorder at each end of said trunk for recording direct-current use request signals from said connecting equipment at said end lasting less than said fixed time.

4. Apparatus according to claim 3 in which the fixed time is determined by a monostable multivibrator having an unstable state characterized by said fixed time, said apparatus including means for arming said second recorder during said unstable state and disarming said second recorder when said unstable state ceases to exist, means for starting said unstable state in response to a direct-current signal corresponding to an alternating-current signal level change, and means for resetting said multivibrator whenever said first recorder records a disturbance and whenever said second recorder records a use request lasting less than said fixed time.

5. In a communication system of the type in which a characteristic of an idle channel marking signal is changed for supervisory signaling, an apparatus for indicating channel transmission disturbances, comprising means for detecting changes in said marking signal, means for temporarily storing detected changes including and accompanying changes similar to supervisory signaling changes in said characteristic, means for erasing said stored changes whenever similarity to said supervisory signaling changes endures at least as long as an expected minimum duration of said supervisory signal changes, and means for making a permanent record of all of said detected changes that are not erased.

No reference cited.

KATHLEEN H. CLAFFY, *Primary Examiner.*

A. McGILL, *Assistant Examiner.*